US011439116B1

(12) United States Patent
Brown et al.

(10) Patent No.: US 11,439,116 B1
(45) Date of Patent: Sep. 13, 2022

(54) FLUID MEASUREMENT DEVICE AND METHODS OF MAKING AND USING THE SAME

(71) Applicants: Stan Brown, Visalia, CA (US); Monte Lininger, Hanford, CA (US)

(72) Inventors: Stan Brown, Visalia, CA (US); Monte Lininger, Hanford, CA (US)

(73) Assignee: BECO Dairy Automation Inc., Hanford, CA (US)

( * ) Notice: Subject to any disclaimer, the term of this patent is extended or adjusted under 35 U.S.C. 154(b) by 806 days.

(21) Appl. No.: 16/159,227

(22) Filed: Oct. 12, 2018

Related U.S. Application Data

(62) Division of application No. 15/098,065, filed on Apr. 13, 2016, now Pat. No. 10,159,213.

(51) Int. Cl.
| *A01J 5/01* | (2006.01) |
| *G01F 1/84* | (2006.01) |
| *A01K 1/12* | (2006.01) |
| *A01J 5/04* | (2006.01) |
| *G01F 1/56* | (2006.01) |

(52) U.S. Cl.
CPC .............. *A01J 5/01* (2013.01); *A01J 5/041* (2013.01); *A01K 1/12* (2013.01); *G01F 1/56* (2013.01); *G01F 1/8404* (2013.01)

(58) Field of Classification Search
CPC .............. A01J 5/01; G01F 1/56; G01F 1/64
See application file for complete search history.

(56) References Cited

U.S. PATENT DOCUMENTS

| 3,770,020 A | 11/1973 | Tamura et al. |
| 3,989,009 A | 11/1976 | Robar et al. |
| 4,011,838 A | 3/1977 | Nordegren et al. |
| 4,433,577 A | 2/1984 | Khurgin et al. |

(Continued)

FOREIGN PATENT DOCUMENTS

| CA | 2225441 A1 | 8/1999 |
| DE | 3737607 A1 | 5/1989 |

(Continued)

OTHER PUBLICATIONS

Francis Beaulieu; "Portable Milk Flow Rate Detector"; Bibliographic data of CA2225441 (A1); Aug. 19, 1999; https://worldwide.espacenet.com.

*Primary Examiner* — Livius R. Cazan
(74) *Attorney, Agent, or Firm* — Andrew D. Fortney; Central California IP Group, P.C.

(57) ABSTRACT

A fluid measurement device and methods of manufacturing and using the same are disclosed. The fluid measurement device includes a conduit configured to transport a fluid, a conductivity sensor in the conduit, and a voltage sensor in the conduit and having first and second rings, probes, or plates. The conductivity sensor is configured to determine the conductivity of the fluid. The voltage sensor is configured to receive a first voltage on the first ring, probe, or plate and detect a capacitance or a second voltage on the second ring, probe, or plate. A value of the capacitance or second voltage corresponds to the amount of fluid in the voltage sensor. The total amount of fluid through the conduit may be determined from amount of fluid in the voltage sensor, the fluid flow rate, the fluid velocity, and the number of samples or the sampling rate.

19 Claims, 5 Drawing Sheets

(56) References Cited

U.S. PATENT DOCUMENTS

| | | | |
|---|---|---|---|
| 4,873,943 A | 10/1989 | Pulvermacher | |
| 4,920,795 A | 5/1990 | Codazzi et al. | |
| 5,012,955 A | 5/1991 | Shannon | |
| 5,035,139 A | 7/1991 | Hoefelmayr et al. | |
| 5,094,112 A | 3/1992 | Hoefelmayr et al. | |
| 5,245,946 A | 9/1993 | Hoefelmayr et al. | |
| 5,503,026 A | 4/1996 | Bohm et al. | |
| 5,546,813 A | 8/1996 | Hastings et al. | |
| 5,792,964 A | 8/1998 | Van Den Berg | |
| 5,873,323 A | 2/1999 | Van Den Berg et al. | |
| 5,880,376 A | 3/1999 | Sai et al. | |
| 6,508,109 B2 | 1/2003 | Van Den Berg | |
| 6,588,268 B1 | 7/2003 | Yamagishi et al. | |
| 6,604,053 B2 | 8/2003 | Fematt | |
| 6,606,251 B1 | 8/2003 | Kenny, Jr. et al. | |
| 6,655,221 B1 | 12/2003 | Aspelund et al. | |
| 6,722,208 B2 * | 4/2004 | Brown | A01J 5/007 73/861.15 |
| 6,781,389 B1 | 8/2004 | Colvin et al. | |
| 6,799,474 B2 | 10/2004 | Brown et al. | |
| 6,990,924 B2 | 1/2006 | Brown et al. | |
| 7,051,673 B2 | 5/2006 | Brown et al. | |
| 7,063,043 B2 | 6/2006 | Brown et al. | |
| 7,174,848 B2 | 2/2007 | Brown et al. | |
| 7,841,296 B2 | 11/2010 | Brown et al. | |
| 2002/0148407 A1 | 10/2002 | Brown et al. | |
| 2004/0154547 A1 | 8/2004 | Brown et al. | |
| 2004/0168647 A1 | 9/2004 | Brown et al. | |
| 2005/0034518 A1 | 2/2005 | Wamhof et al. | |
| 2006/0041400 A1 | 2/2006 | Nilson et al. | |
| 2007/0137580 A1 | 6/2007 | Brown et al. | |
| 2007/0209595 A1 | 9/2007 | Umegard et al. | |
| 2014/0200836 A1 | 7/2014 | Lee | |
| 2014/0297203 A1 | 10/2014 | Liao et al. | |
| 2014/0373787 A1 | 12/2014 | Petterson | |
| 2016/0195524 A1 | 7/2016 | Cowan et al. | |

FOREIGN PATENT DOCUMENTS

| | | | |
|---|---|---|---|
| DE | 4110146 A1 | 10/1992 | |
| DE | 4243077 A1 | 6/1993 | |
| EP | 0318388 A1 | 5/1989 | |
| EP | 1543719 A1 * | 6/2005 | A01J 5/01 |
| WO | 0119170 A1 | 3/2001 | |

* cited by examiner

FLUID MEASUREMENT DEVICE AND METHODS OF MAKING AND USING THE SAME

RELATED APPLICATIONS

This application is a divisional of U.S. patent application Ser. No. 15/098,065, filed on Apr. 13, 2016, incorporated herein by reference in its entirety.

FIELD OF THE INVENTION

The present invention generally relates to the field of fluid measurement devices. More specifically, embodiments of the present invention pertain to a novel fluid measurement device that is particularly useful for milking systems, and methods of manufacturing and using the same.

DISCUSSION OF THE BACKGROUND

Currently, demands of milk production from dairy animals are relatively high. To meet such demands, more accurate, efficient, and effective methods of determining the amount of fluid produced by dairy animals are needed. Fluid measuring devices such as milk flow meters determine the amount of milk produced from dairy animals. Generally, fluid measuring devices assist in monitoring whether the milking system, such as the hoses, vacuums, etc., are properly functioning and/or whether the dairy animal is producing a sufficient or adequate amount of milk.

The efficiency and effectiveness of conventional fluid measuring devices for measuring the amount of milk produced by dairy animals during milking may be less than ideal, resulting in incorrect or ineffective data. One conventional fluid measuring device requires multiple sensors to determine the amount of fluid flow. This conventional fluid measuring device determines the height of the milk flow at different sensors. However, fluid flow mechanics may change the shape of the fluid as it moves through a conduit or tube containing the sensors, which may affect the accuracy of the measurement. In addition, the inclusion of plural sensors increases the chance of equipment failure and/or additional maintenance.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to a novel fluid measurement device and methods of manufacturing and using the same. The present invention provides a fluid measurement device that advantageously measures a volume and/or weight of a fluid (e.g., milk produced by a dairy animal during a milking session). The present fluid measurement device may efficiently and effectively determine the amount of milk produced by a dairy animal, and advantageously provide accurate measurements of fluid flowing or passing through a conduit.

In one aspect, the present invention relates to a fluid measurement device that includes a conduit configured to transport a fluid, a conductivity sensor in the conduit, and a voltage sensor in the conduit. The conductivity sensor is configured to determine an electrical conductivity or voltage of the fluid. The voltage sensor has first and second rings, probes, or plates. The first ring, probe, or plate is configured to receive a first predetermined voltage, and the second ring, probe, or plate is configured to detect a capacitance or second voltage. The value of the capacitance or second voltage corresponds to an amount of the fluid in the conduit between the first and second rings, probes, or plates. Typically, the fluid comprises water or another electrically conductive fluid. In one example, the fluid is milk.

In exemplary embodiments of the present invention, the conduit includes a cylinder or a tube. In various examples, the cylinder or tube may comprise or include a non-conductive material. For example, the non-conductive material may include a plastic material, such as high modulus polyethylene (PE) tubing or polytetrafluoroethylene (TEFLON®) tubing, glass, ceramic, porcelain, rubber, fiberglass, and/or a combination thereof.

In exemplary embodiments of the present invention, the voltage sensor may extend from an uppermost surface of the conduit to a lowermost surface of the conduit. For example, when the conduit includes a cylinder, the first and second rings, probes, or plates may be in continuous contact with/or embedded in the external or internal surface of the cylinder. Generally, the first and second rings, probes, or plates of the voltage sensor have an identical shape and are spaced apart from each other at a first predetermined distance.

In some embodiments of the present invention, the conductivity sensor is on or along the lowermost internal surface of the conduit. The conductivity sensor includes first and second electrodes spaced apart from each other by a second predetermined distance.

In exemplary embodiments of the present invention, the fluid measurement device further includes a processor configured to measure a volume and/or weight of the fluid from the electrical conductivity (or voltage) of the fluid measured by the conductivity sensor and the capacitance or the second voltage from the voltage sensor. In further embodiments of the present invention, the fluid measurement device further comprises a look-up table having columns and rows (e.g. storing values of the volume of fluid between the rings, probes, or plates of the voltage sensor), and the processor is configured to identify one of the columns from the electrical conductivity of the fluid and one of the rows from the voltage or capacitance from the voltage sensor. In one example, the processor is configured to estimate and/or interpolate the conductivity of the fluid from a second look-up table that correlates the voltage from the conductivity sensor with the conductivity of the fluid.

In various embodiments of the present invention, the fluid measurement device may have a hose attached thereto. In such embodiments, a velocity of the flow of the fluid may be based on or determined from an angle of the conduit and a length of the hose. Alternatively, the velocity may be determined empirically. For example, the velocity may be determined by estimating the velocity and subsequently refining the estimate using measurements of the fluid volume through the conduit per unit time. The hose may include a shutoff valve. The processor is configured to calculate the weight and/or volume of the fluid from the velocity of the fluid, the volume of fluid in the voltage sensor, and the voltage sampling rate. The volume of the fluid may be calculated in gallons or liters, and may be converted to weight (e.g., pounds [lbs.] or kilograms [kg]) using the density of the fluid. The processor may also adjust the volume of fluid (e.g., by adjusting the conductivity and/or density of the fluid) for any variation of the measured temperature of the fluid from a normalized or reference temperature value.

Another aspect of the present invention relates to a milking system that includes the present fluid measurement device, a milking claw, and if not present in the fluid measurement device, a hose connecting the milking claw to the fluid measurement device, and an optional shut-off valve. The system may measure the amount of milk produced by a dairy animal (e.g., a cow) in a single milking. In some embodiments, the present system may further comprise a vacuum source configured to periodically apply a vacuum to the milking claw, and an external controller (e.g., a PC) configured to control the vacuum source and, at least in part, the fluid measurement device. For example, the fluid measurement device may be configured to receive a command from a user interface device (e.g., the external controller, a switch, etc.), in which the command starts and stops the process for measuring the volume and/or weight of the fluid.

A further aspect of the present invention relates to a method of measuring an amount (e.g., a weight and/or volume) of a fluid, including applying a first predetermined voltage to a first ring, probe, or plate of a voltage sensor, detecting at a predetermined rate a capacitance or a second voltage on a second ring, probe, or plate of the voltage sensor, determining an electrical conductivity (or voltage) of the fluid using a conductivity sensor, and calculating the volume and/or weight of the fluid from the amount of fluid between the first and second rings, probes, or plates, a velocity of the fluid (e.g., through the fluid measurement device), and the predetermined rate. The fluid passes through the first and second rings, probes, or plates, which are spaced apart from each other by a predetermined distance. The value of the capacitance or second voltage corresponds to the amount of the fluid in a conduit between the first and second rings, probes, or plates. The conductivity sensor is in the conduit, and the first and second rings, probes, or plates are on or in the conduit. The velocity may be based on or determined from an angle of the conduit and a length of an optional hose that is attached thereto (e.g., between a milking claw and the conduit). Alternatively, the velocity may be estimated or determined empirically. In various embodiments, the fluid is milk.

In exemplary embodiments, the method includes selecting or identifying the volume of fluid between the first and second rings, probes, or plates of the voltage sensor from values in a look-up table using the electrical conductivity and the second voltage or capacitance. Optionally, the volume of fluid may be further determined by interpolation using the closest voltage values identified or selected in the look-up table.

An even further aspect of the present invention relates to a method of manufacturing a fluid measurement device, including forming a conduit with a conductivity sensor and a voltage sensor having first and second rings, probes, or plates spaced apart at a predetermined distance in the conduit, electrically connecting the conductivity sensor to a current source or first voltage, and the first ring, probe, or plate of the voltage sensor to a second voltage, respectively, and electrically connecting the second ring, probe, or plate to a processor configured to measure an amount (e.g., a volume and/or weight) of the fluid from the electrical conductivity or first voltage of the fluid and a capacitance or third voltage from the second ring, probe, or plate.

In various embodiments of the present invention, the first and second rings, probes, or plates may extend from an uppermost surface of the conduit to a lowermost surface of the conduit, such that the fluid passes through each of the first and second rings, probes, or plates. Also, the conductivity sensor may be at or along the lowermost internal surface of the conduit.

The present fluid measurement device and method(s) advantageously measure the amount of fluid produced by dairy animals during milking more efficiently and effectively than conventional fluid measuring devices. The present fluid measurement device advantageously provides high capacity, good reliability, and upgradeability in dairy automation systems for the demanding needs of high-producing dairy animals (e.g., cows) milked in large milking parlor operations. The present device and method can continually capture vital system and single cow information to enable operators to efficiently and effectively manage every milking session to optimize or maximize production and quality of milk from every cow during each milking. The present device and method can also help monitor the health of the dairy animals from data collected during the milking operation.

These and other advantages of the present invention will become readily apparent from the detailed description of various embodiments below.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and materials have not been described in detail so as not to unnecessarily obscure aspects of the present invention.

Thus, the technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained or derived by one skilled in the art without creative contribution and are in the scope of legal protection given to the present invention.

Furthermore, all features, structures, characteristics, measures or processes disclosed in this document, except those that are mutually exclusive, can be combined in any manner and in any combination possible. Any feature, structure, characteristic, measure or process disclosed in the present specification, claims, Abstract and Figures can be replaced by other equivalent feature, structure, characteristic, measure or process, or feature, structure, characteristic, measure or process with similar objectives, purposes and/or functions, unless specified otherwise.

Embodiments of the present invention relate to a fluid measurement device and methods of making and using the same. The present fluid measurement device and method(s) advantageously measure and calculate the amount of fluid passing through a conduit that contained the voltage sensor and the conductivity sensor. The present fluid management device and method of use can accurately and efficiently determine the amount of milk produced by a dairy animal. For example, the fluid measurement device and method advantageously determine a volume and/or weight of milk using a single voltage sensor.

An Exemplary Fluid Measurement Device

Figure 1:
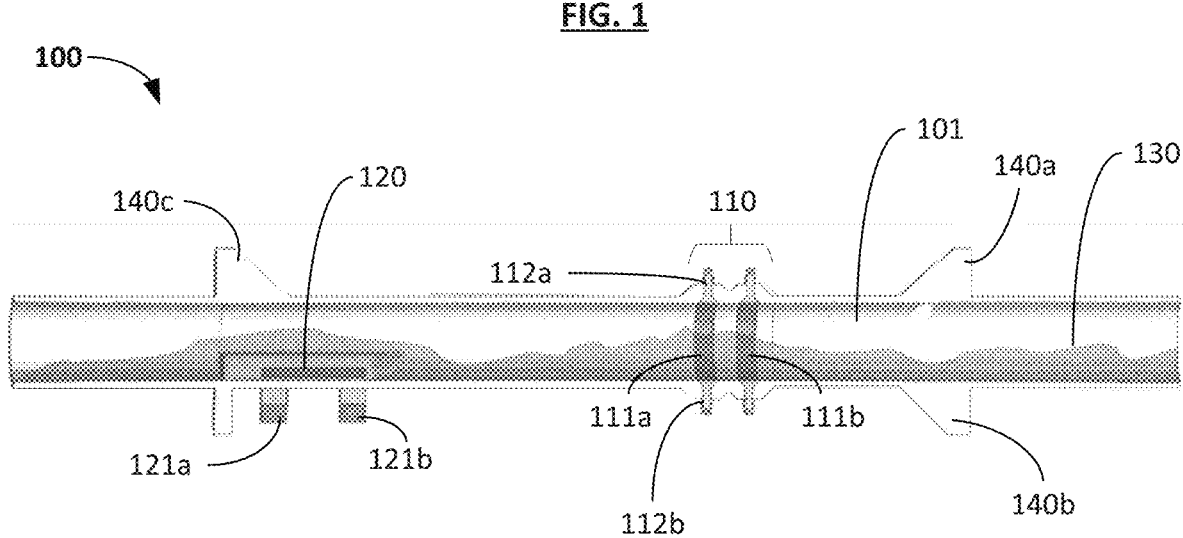
FIG. 1 is a cross-sectional view of an exemplary fluid measurement device according to an embodiment of the present invention.

FIG. 1 shows an exemplary fluid measurement device 100 (e.g., a meter) according to embodiments of the present invention. The device 100 generally comprises a conduit 101 configured to transport a fluid 130, a conductivity sensor 120 in the conduit 100, configured to determine a conductivity of the fluid, and a voltage sensor 110 having first and second rings or plates 111a, 111b in the conduit 101. The voltage sensor 110 is configured to receive a first predetermined voltage on the first ring or plate 111a and detect a capacitance or a second voltage on the second ring or plate 111b. The value of the capacitance or the second voltage corresponds to the amount of the fluid 130 in the conduit 101 between the first and second rings or plates 111a, 111b. Alternatively, the first and second rings or plates 111a, 111b may be probes. Generally, the fluid comprises water, and in one example, is milk from a dairy animal, such as a cow or a goat. The device 100 of FIG. 1 is particularly suitable for use in a milking system, such as the milking system 600 shown in FIG. 6, which includes a milking claw 610, a hose 620, and the present fluid measurement device 100.

The conduit 101 may have a cylindrical or tube-like shape. Alternatively, the conduit 101 may have a cross-section with an oval, square, rectangular, or other polygonal shape. In one example, the conduit comprises or consists of a plastic. For example, the plastic may comprise, but is not limited to, polyurethane, nylon, vinyl (e.g., PVC), polyethylene, polypropylene, or any combination thereof (e.g., with glass, metal, or another plastic). Alternatively, the conduit may comprise a glass, a ceramic, porcelain, a rubber, fiberglass, and/or a combination thereof. The conduit 101 has dimensions to facilitate the flow of the fluid 130. For example, the conduit 101 may have a length of from 4 inches (100 mm) to 12 inches (300 mm) and an inner diameter of from % inch (10 mm) to 2 inches (50 mm).

Figure 2:
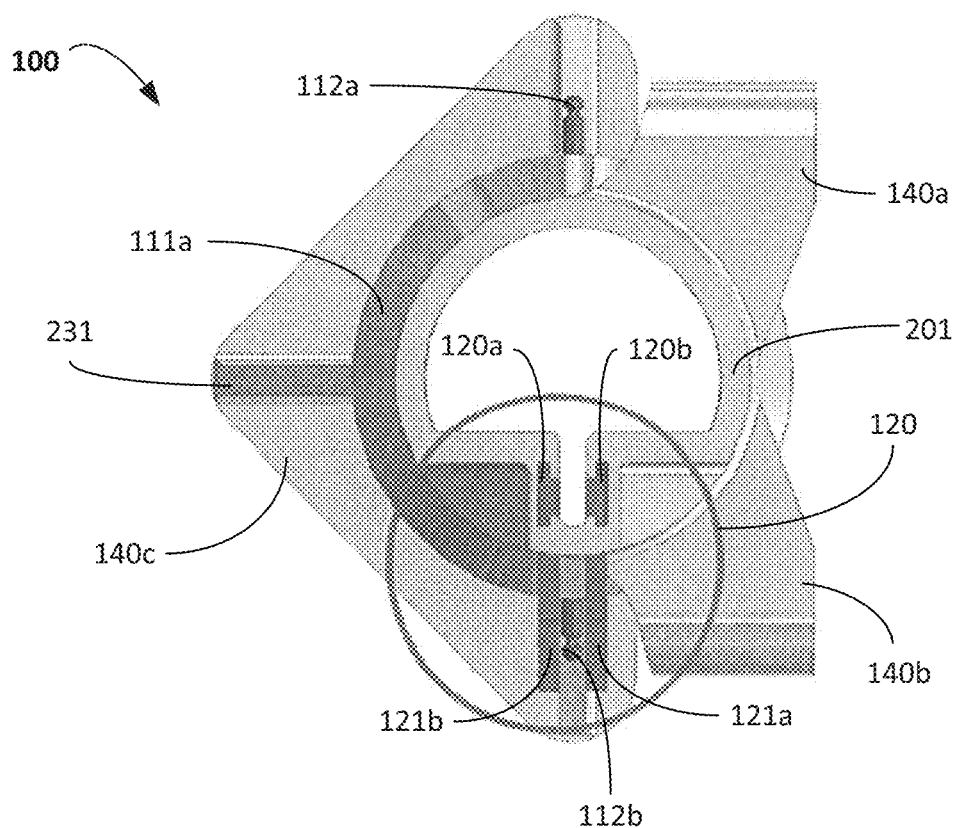
FIG. 2 is an end-on view of the fluid measurement device of FIG. 1, showing exemplary conductivity and voltage sensors according to an embodiment of the present invention.

In exemplary embodiments, the voltage sensor 110 is along an inner surface of the conduit 101. Alternatively, the voltage sensor 110 may be on an outer surface of the conduit 101. In various embodiments, the voltage sensor 110 includes two metallic sensor rings or plates 111a and 111b. The first and second rings or plates 111a and 111b may be spaced apart or separated from each other by a predetermined distance. In cylindrical conduits, such as conduit 101, the rings or plates 111a-b may be annular (e.g., having a circular cross-section) or semi-annular (e.g., having a semi-circular cross-section, as shown in FIG. 2). The distance between the first and second rings or plates 111a and 111b provides a volume in the conduit 101 for sampling the amount of the milk 130.

Generally, each ring or plate 111a-b of the voltage sensor 110 has two leads 112a-b in electrical contact with an end of the ring or plate, as shown in FIG. 2. In one example, the voltage sensor 110 extends from an uppermost surface of the conduit 101, along the interior or exterior wall(s) of the conduit 101, to a lowermost surface of the conduit 101, as shown in FIGS. 1-2. Alternatively (e.g., in applications in which the fluid does not or cannot completely fill the conduit), the rings or plates 111a-b of the voltage sensor 110 may extend along part or most of the surface of the conduit 101, as long as the rings or plates 111a-b extend to a height in the conduit 101 greater than or equal to the maximum height of the fluid in the conduit 101. In some embodiments, the rings or plates 111a-b of the voltage sensor 110 may be adhered to the conduit 101, embedded within a recession along the outer or inner surface of the conduit 101, and/or be connected by clips, clamps and/or straps to the outer or inner surface or wall of the conduit 101.

The conduit 101 also includes a conductivity sensor 120 that may be separated from the voltage sensor 110 by a predetermined distance and/or gap. The conductivity sensor 120 may be downstream or upstream from the voltage sensor 110. In various embodiments, the conductivity sensor includes first and second electrodes (e.g., electrodes 120a-b in FIG. 2), spaced apart from each other by a predetermined distance and configured to determine the electrical conductivity or voltage of the fluid 130 (e.g., from the capacitance across the electrodes 120a-b). In one embodiment, the conductivity sensor 120 applies a first voltage to one electrode, and determines a voltage on the electrode to which the first voltage is not applied. In such a case, a processor or other logic device (not shown) determines or estimates the conductivity from the voltage on the second electrode (i.e., when the first voltage is applied to the first electrode). Alternatively, the conductivity sensor 120 can measure conductivity directly. The conductivity sensor 120 may further comprise leads or contacts 121a-b. In the example shown in FIG. 1, both leads 121a-b are connected to one of the first and second electrodes 120a-b, but identical or substantially identical leads may be connected to the other of the first and second electrodes 120a-b. Alternately, only one lead is connected to each electrode (and, for example, the fluid 130 in the conduit 101 completes the electrical circuit including the first and second rings or plates 111a-b).

Figure 3:
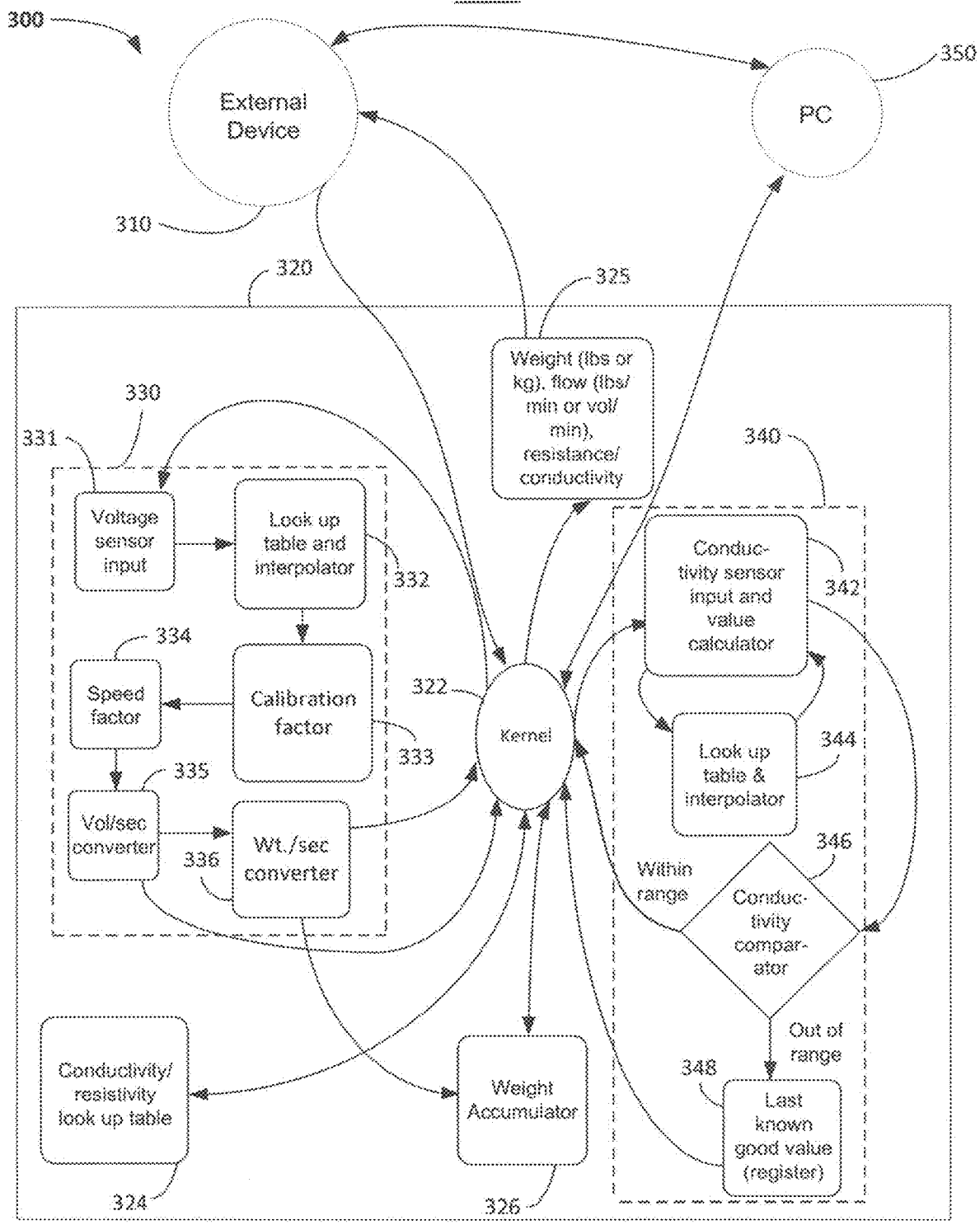
FIG. 3 is a diagram showing exemplary interactions between firmware and hardware in a milk measurement system according to one or more embodiments of the present invention.

The device 100 of FIG. 1 may also include a user interface device (e.g., the external device 310 of FIG. 3). Also, the device 100 of FIG. 1 may have an electronic circuit board mounted thereon (e.g., by securing it to extensions or "fins" 140a-b). A processor (not shown) configured to measure the volume and/or weight of the fluid from the electrical conductivity of the fluid determined by the conductivity sensor 120 and the capacitance or the second voltage from the voltage sensor 110 may be mounted on the electronic circuit board. In further embodiments, the processor may measure the amount of fluid from these parametric values, the velocity of the fluid (e.g. through the meter), and the sampling rate (e.g., of the second voltage or capacitance).

Figure 6:
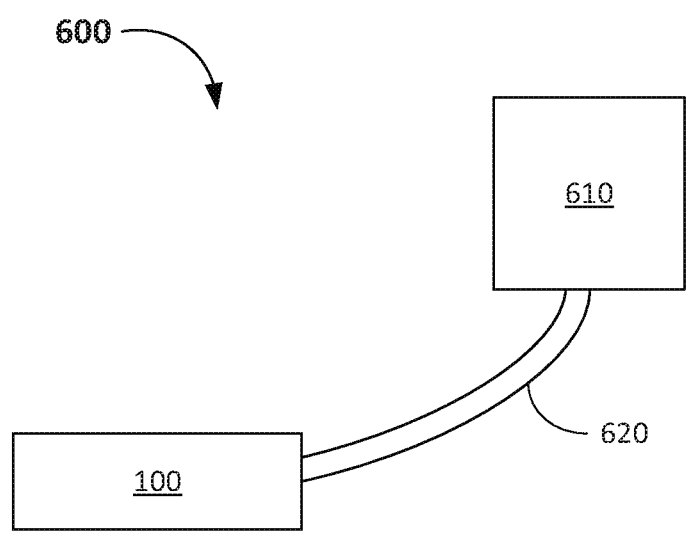
FIG. 6 is a block diagram showing an exemplary milking system including the present fluid measurement device.

Furthermore, a system 600 including the fluid measurement device 100 of FIG. 1 is shown in FIG. 6 and may comprise a milking claw 610 at one end of the fluid measurement device 100, a tank or reservoir at an opposite end of the fluid measurement device 100, a first hose 620 attached to the milking claw and the fluid measurement device 100, and a second hose (not shown) between the tank or reservoir and the fluid measurement device 100. A shutoff valve (not shown) configured to control out flow of the fluid from the milking claw and/or fluid measurement device 100 may be in one of the hoses, or between one of the hoses and one of the attached devices. In one example, the shutoff valve is between the milking claw and the first hose. The length of the hoses may vary, depending on the dimensions of the milking system. In the system, the device 100 may receive a command from a user interface device (e.g., an external device, a take-off board, or a PC controlling the system including the fluid measurement device 100) or a switch on the take-off board or the fluid measurement device to start and stop the process for measuring the amount of fluid.

FIG. 2 shows an end-on view of the conduit 100 of FIG. 1, showing parts of the exemplary voltage sensor 110 and the exemplary conductivity sensor 120 according to embodiments of the present invention. In exemplary embodiments, the first and second rings or plates 111a and 111b of the voltage sensor 110 may be on an outer surface of the cylindrical wall 201 of the conduit 100. Each of the first and second rings or plates 111a-111b may be in electrical contact with first and second leads or terminals 112a and 112b, to which wires may be connected. The wires may provide a first predetermined voltage to the first ring or plate 111a, and may connect the second ring or plate 111b to the processor (not shown). The first terminal 112a is on an outer uppermost surface of the conduit 101, and the second terminal 112b is on an outer lowermost surface of the conduit 101, as shown in FIG. 2. In some embodiments, the voltage sensor 110 wraps around an outer surface of the conduit 101. For example, the voltage sensor 110 extends from the outer uppermost surface to the outer lowermost surface of the conduit 101, as shown in FIG. 2. In various embodiments, the voltage sensor 110 may be adhered to the conduit 101 or connected by clips, clamps and/or straps.

In exemplary embodiments, the conductivity sensor 120 has first and second electrodes 120a and 120b separated by a predetermined distance (e.g., a channel through which the fluid 130 flows). The first and second electrodes 120a and 120b are placed along the lowermost part of the cylindrical conduit 201 along the lowermost surface of the conduit 200, as shown in FIG. 2. Each electrode 120a and 120b of the conductivity sensor 120 has a corresponding lead 121a-b that extends through the outer surface of the conduit 101. Alternatively, the leads 121a-b are connected to one of the first and second electrodes 120a-b, and identical or substantially identical leads are connected to the other of the first and second electrodes 120a-b.

Additionally, the conduit 101 may include extensions or "fins" 140a-c. The fin 140c is configured to secure and/or lock the conduit into position in a holder (not shown) during use. The fins 240a-b are also configured to secure or lock the conduit into position, and can provide a surface for mounting a circuit board (e.g., by screwing the circuit board into orthogonal openings 242a-b at ends of the fins 140a-b). Furthermore, the extension or fin 140c may include a connector 231 configured to secure the conduit 101 to the holder or other mechanical stabilizing structure during use.

Exemplary Hardware and Firmware for Calculating a Weight and/or Volume of a Fluid FIG. 3 shows a diagram of a system 300 including exemplary hardware and firmware for calculating a weight and/or volume of a fluid according to the present invention. The exemplary hardware and firmware 300 includes an external device (e.g., a user interface device) 310, a processor 320, and an optional system controller (e.g., a PC) 350. In exemplary embodiments, the processor 320 is on a printed circuit board [PCB] attached to or mounted on the meter and/or fluid measurement device. The external device 310 may also include a printed circuit board (PCB) or a take-off board with a switch thereon. Alternatively, the switch may be on the fluid measuring device. The processor 320 may include or communicate with the conductivity and voltage sensors discussed above with regard to FIGS. 1-2. The processor (e.g., a central processing unit) 320 includes a kernel 322, an amount calculator 330, and a conductivity estimator 340. In exemplary embodiments of the present invention, the kernel 322 controls the flow of information between various hardware components and/or firmware blocks. In some embodiments, the kernel 322 also controls the timing of the information being transferred.

In exemplary embodiments, the external device 310 provides a start signal to the fluid measurement device (e.g., meter) and the processor 320 to begin the measuring process and a stop signal to end the measuring process. Alternatively, the start signal may be provided by the PC 350. Information collected by the fluid measurement device is used by the processor 320 to calculate the total weight or volume of the fluid passing through the fluid measuring device within a given time period (e.g., from the start signal to the stop signal) and report the same using the weight and/or flow reporting block 325 (which, in one embodiment, comprises a register).

An Exemplary Flow Rate Calculation

In various embodiments, a voltage sensor input 331 receives a sensed capacitance or voltage from the voltage sensor (e.g., in response to the processor kernel 322 reading the voltage sensor). In various embodiments, the voltage sensor is read or sampled from 10 to 10,000 times per second, or any value or range of values therein (e.g., in one example, approximately 800 times per second). The fluid flowing through the conduit (e.g., the tube) causes the voltage from the voltage sensor to vary based on the volume of the fluid in the voltage sensor and the electrical conductivity of the fluid. The voltage reading is compared with values in the look-up table (LUT) 332, which has a plurality of columns and a plurality of rows therein, to obtain the volume of fluid in the voltage sensor. The columns correspond to possible ranges of the electrical conductivity of the fluid, and the rows correspond to ranges of voltages from the voltage sensor, in one embodiment. In such an embodiment, the column of the look-up table 332 is selected based on the conductivity value of the fluid, and interpolation (e.g., row selection) is performed using the voltage for the voltage sensor to determine the volume of fluid present in the voltage sensor from the data in the look-up table 332. Alternatively, the voltage reading may be calculated using formulas when the fluid measurement device includes a voltage sensor with sufficiently high precision and/or accuracy.

A calibration value or factor may be applied by a calibration factor block 333 and to the fluid volume determined using the look-up table 332. The calibration value or factor "scales" the volume to an actual volume, based on manufacturing tolerances of and/or variables (e.g., the temperature of the fluid) in the fluid measurement device. The calibration value or factor, the tolerances, and the variable values may be measured or empirically determined.

The speed factor block 334 multiplies the volume of fluid in the voltage sensor by the velocity of the fluid. In one embodiment, the speed factor block 334 may determine or estimate the velocity of the fluid from the angle of the fluid measuring device, and optionally, from the distance that the fluid travels through a hose attached to the fluid measurement device (e.g., from an initial reference point, in the hose or another device in the milking system such as the end of the milking claw, to the fluid measurement device). Alternatively, the velocity of the fluid may be empirically determined and/or measured using a reference fluid having known properties, and simply programmed or recorded in memory for use by the speed factor block 334.

Next, the flow rate of the fluid is calculated from the velocity or speed factor and the volume of the fluid in the voltage sensor. In one embodiment, the flow rate is calculated in units of volume/unit time (e.g., for example, in gallons per second) using a volume/second converter 335. Thereafter, a weight flow rate (e.g., in units of weight/second) converter 336 may convert the volume flow rate into a weight flow rate (in one example, in pounds per second).

Subsequently, the weight flow rate from the flow rate calculator 330 is divided by the sampling rate (e.g., the number of samples per second from the voltage sensor), and the quotients from each sample are accumulated in a weight accumulator 326 until the fluid measurement device receives the stop signal. The accumulator 326 determines the weight of the fluid that passed through the fluid measurement device for a given time period. Alternatively, the volume flow rate can be similarly divided (e.g., by the sampling rate) and accumulated by the weight accumulator block 326 to determine the volume of fluid passing through the fluid measurement device during the given time period.

An Exemplary Conductivity Estimation

The kernel 322 instructs the processor 320 to read the conductivity sensor, which provides a measured voltage or current to the conductivity sensor input and value calculator 342, which calculates or estimates the conductivity of the fluid (e.g., in microsiemens [μS]). The conductivity calculator 342 also stores temporarily the voltage or current from the conductivity sensor, then correlates the voltage or current to the conductivity of the fluid in the look-up table and interpolator 344. The measured voltage and/or current may be compared to corresponding conductivity or resistivity values in the look-up tables 324 and/or 344. Alternatively, in embodiments that use a conductivity sensor having sufficient precision and/or accuracy, the conductivity may be determined using known or derivable formulas (e.g., from a relatively accurate voltage measurement). The look-up tables 324 and 344 are generally stored in a non-volatile memory (e.g., in the processor 340, or alternatively, elsewhere on the printed circuit board or in the PC 350). The look-up tables 324 and 344 include values of conductivities that are within a possible or likely conductivity range for the particular fluid. For example, when the fluid is milk, the conductivity range may be from 4.5 μS to 7.5 μS. The look-up table 344 may store values within this range, in regularly spaced increments (e.g., 0.1 μS, 0.25 μS, 0.5 μS, 1 μS, etc.). A linear interpolation (see, e.g., the interpolation formulas and examples below) may be used to determine the actual conductivity value and/or voltage of the fluid using the conductivity table (Table 1) below, where "volts" refers to the voltage from the capacitance sensor, and "microsiemens" refers to the corresponding estimated conductivity of the fluid:

TABLE 1

| Volts | Microsiemens (μS) |
|---|---|
| <2.1185 | 4.5 |
| 2.1185-2.2609 | 5 |
| 2.2610-2.4034 | 5.5 |
| 2.4035-2.4984 | 6 |
| 2.4985-2.5934 | 6.5 |
| 2.5935-2.6884 | 7 |
| >2.6885 | 7.5 |

The above table (in the look-up table and interpolator 344) is accessible using software, and in some embodiments, can be rewritten as needed or desired.

In one embodiment, the conductivity is compared by a conductivity comparator 346 to the possible, likely or expected conductivity range of the fluid to determine whether the conductivity of the fluid is out of the range in Table 1 above. Alternatively, the conductivity comparator 346 can compare the voltage and/or capacitance from the conductivity sensor to the expected range of voltages and/or capacitances from the conductivity sensor to determine whether they are in or out of the expected range. Generally, any values outside of the possible, likely or expected range are ignored, as a value outside this range indicates that there is insufficient fluid in the conductivity sensor to complete the conductivity sensor circuit. For example, although the conductivity value of the fluid may vary slightly from the start of the measuring process to the end of the measuring process, and the values may also vary from fluid source to fluid source (e.g., dairy animal to dairy animal), a rapid decline or change in conductivity generally means the conductivity sensor "cell" is not full (e.g., filled with fluid).

Separately, the average stored value or the last known acceptable value is stored in a register (or other memory) 348. The value stored in the register/memory 348 should be used in the event that the conductivity (or voltage or capacitance) value is outside of the possible, likely or expected range. The conductivity (either estimated by value calculator 342 or, if the conductivity is outside the possible, likely or expected range, from the register/memory 348) is used for proper selection of the fluid volume in the voltage sensor and interpolation of the flow volume through the voltage sensor from the voltage or capacitance thereof (in volts or pF).

Interpolation Formulas and Examples

One embodiment, the conductivity of the fluid measured by the conductivity sensor can be calculated according to the following formula (1):

$$C=(((Vr-V1)*(C2-C1))/(V2-V1))+C1 \qquad (1)$$

where Vr is the conductivity sensor voltage, V1 and V2 are the nearest voltage values in the look-up table 344 to Vr (e.g., V1<Vr<V2), and C1 and C2 are corresponding conductivity values in the look-up table 322 that match or correspond to V1 and V2. In this example, the known values are V1, V2, Vr, C1 and C2.

The unknown value is C, the estimated or calculated conductivity of the fluid. In one example, if Vr is 2.454, then C=(((2.454−2.4035)*(6.5−6))/(2.4985−2.4035))+6, or 6.2658. The conductivity value C will be subsequently used for a milk sensor curve selection and interpolation of the sensor voltage using the look-up table (LUT) 332.

In various embodiments, the voltage sensor range may be from 0.03 to 3.5 volts. The look-up table 332 (an example of which is shown in Table 2 below) may range between endpoints within the voltage sensor range (e.g., from 0.07 to 3.434 volts). The look-up table 332 may have a number of rows and a number of columns corresponding to the increments of the voltage sensor range and the conductivity range (from look-up table 344), respectively. The first column in Table 2 below represents the voltage read from the voltage sensor, and each additional column is a milliliter conversion curve specific to a conductivity value ranging from 4.5 μS to 7.5 μS in 0.5 μS increments (compare the first column in Table 1 with the first row in Table 2). Generally, the look-up table 332 is stored in a non-volatile memory in the processor 320 or on the external device 310 and may be accessible by software in the PC 350 for modification during testing. Bilinear interpolation may be used to find the appropriate volume (ml) value, as shown in Example 1 below.

TABLE 2

|  | 4.5 | 5 | 5.5 | 6 | 6.5 | 7 | 7.5 | Conductivity value of column |
|---|---|---|---|---|---|---|---|---|
|  | 0.070 | 0.000 | 0.000 | 0.000 | 0.000 | 0.000 | 0.000 | 0.000 |  |
|  | 0.094 | 0.053 | 0.047 | 0.044 | 0.038 | 0.036 | 0.033 | 0.031 |  |
|  | 0.272 | 0.109 | 0.100 | 0.086 | 0.077 | 0.065 | 0.066 | 0.064 |  |
|  | 0.456 | 0.194 | 0.166 | 0.141 | 0.125 | 0.117 | 0.111 | 0.108 |  |
|  | 0.678 | 0.251 | 0.213 | 0.183 | 0.165 | 0.155 | 0.141 | 0.139 |  |
|  | 0.555 | 0.323 | 0.277 | 0.737 | 0.716 | 0.703 | 0.187 | 0.181 |  |
|  | 1.023 | 0.413 | 0.364 | 0.319 | 0.288 | 0.269 | 0.244 | 0.239 |  |
|  | 1.150 | 0.454 | 0.428 | 0.380 | 0.343 | 0.320 | 0.298 | 0.287 | mL curves |
| Sensor | 1.316 | 0.529 | 0.486 | 0.427 | 0.390 | 0.369 | 0.342 | 0.330 | developed |
| ring | 1.426 | 0.592 | 0.538 | 0.478 | 0.444 | 0.419 | 0.387 | 0.372 | at |
| volts | 1.533 | 0.679 | 0.622 | 0.557 | 0.519 | 0.488 | 0.451 | 0.431 | column |
|  | 1.626 | 0.752 | 0.693 | 0.630 | 0.583 | 0.546 | 0.506 | 0.481 | conductivity |
|  | 1.723 | 0.835 | 0.781 | 0.704 | 0.656 | 0.614 | 0.567 | 0.538 | values |
|  | 1.817 | 0.933 | 0.866 | 0.783 | 0.730 | 0.683 | 0.633 | 0.559 |  |
|  | 1.910 | 1.033 | 0.955 | 0.864 | 0.805 | 0.756 | 0.701 | 0.660 |  |
|  | 1.995 | 1.127 | 1.042 | 0.947 | 0.881 | 0.825 | 0.771 | 0.734 |  |
|  | 2.078 | 1.230 | 1.139 | 1.032 | 0.960 | 0.905 | 0.845 | 0.805 |  |
|  | 2.155 | 1.351 | 1.256 | 1.142 | 1.062 | 1.003 | 0.941 | 0.895 |  |
|  | 2.223 | 1.478 | 1.368 | 1.246 | 1.160 | 1.096 | 1.029 | 0.985 |  |
|  | 2.290 | 1.554 | 1.439 | 1.307 | 1.220 | 1.156 | 1.089 | 1.042 |  |
|  | 2.350 | 1.621 | 1.504 | 1.372 | 1.280 | 1.243 | 1.145 | 1.097 |  |
|  | 2.403 | 1.715 | 1.591 | 1.454 | 1.360 | 1.291 | 1.221 | 1.171 |  |
|  | 2.461 | 1.796 | 1.662 | 1.527 | 1.430 | 1.362 | 1.292 | 1.239 |  |
|  | 2.513 | 1.549 | 1.716 | 1.579 | 1.480 | 1.413 | 1.341 | 1.290 |  |

The volume value (in ml) from look-up table 332 (Table 2) may have a calibration factor or value applied to it (e.g., by multiplication) in calibration factor block 333, as described herein. The calibration factor or value may be stored in the same or different non-volatile memory in the processor 320 or on external device 310. The calibration value may be programmed from software on the PC 350, and may represent a percentage or decimal. The calibration factor accounts for adjustments and/or variations in the speed, velocity and/or temperature of the fluid and in components of the system, meter or other equipment. For example, the calibration factor may be from 0.5 to 2.0, depending on various manufacturing tolerances and fluid measurement device and system variable values. In one example, the presumptive calibration factor is one (1.0). Next, the calibrated volume of fluid (e.g., in ml) is multiplied by the velocity in block 334, which gives a flow rate. The velocity may be determined according to a formula with variables programmed from the PC 350, and the variables may be stored in the same or different non-volatile memory in the processor 320 or on external device 310 (e.g., see Example 2 below). Next, the conversion block 335 converts the volume from block 333 and the velocity from block 334 to the flow rate (e.g., in gallons per second, by multiplying the initial product by 0.01585032). Subsequently, the weight conversion block 336 converts the flow rate (e.g., in gallons/second to a weight-based flow rate (e.g., in pounds [lbs.] per second), by multiplying by 8.34, and then dividing by the number of samples per second. The total weight or volume of the fluid (e.g., milk) is determined by summing all of the weight/second samples in block 326. Design and implementation of alternatives (such as calculating the volume flow rate in in liters per second or gallons per minute, or the weight-based flow rate in kg per second or kg per minute) from the present disclosure are well within the abilities of those skilled in the art.

Example 1: Bilinear Interpolation Equation

A more accurate value of the volume of fluid in the voltage sensor can be calculated or estimated using the following equation (2):

$$MC=(((C2-CC)*(V2-Vr))/((C2-C1)*(V2-V1)))$$
$$*M11+(((CC-C1)*(V2-Vr))/((C2-C1)*(V2-V1)))*M21+(((C2-CC)*(Vr-V1))/((C2-C1)*(V2-V1)))*M12+(((CC-C1)*(Vr-V1))/((C2-C1)*(V2-V1)))*M12 \quad (2)$$

In this example, the known values are V1, V2, Vr, C1, C2, CC, M11, M21, M12 and M22. Vr is the voltage read from the voltage sensor, and V1 and V2 are the nearest voltage values to Vr in the look-up table 332. CC is the estimated conductivity of the fluid as determined by the conductivity estimator 340. C1 and C2 are conductivity values closest to CC in the look-up table 344. Generally, C1≤CC≤C2. The unknown value is MC, the estimated or calculated volume of fluid in the voltage sensor.

In this example, Vr is 1.650, and CC is 6.2658. The other known values are obtained from Table 2 above. For example, V1 is 1.626, V2 is 1.723, C1 is 6, C2 is 6.5, M11 is 0.583, M21 is 0.546, M12 is 0.656, and M22 is 0.614. The relationship between the known values and the unknown MC are shown in Table 3 below:

TABLE 3

|    | C1  | CC | C2  |
|----|-----|----|-----|
| V1 | M11 |    | M21 |
| Vr |     | MC |     |
| V2 | M12 |    | M22 |

Since the difference C1-C2 is constant, a fixed value of 0.5 can be used in place of (C2-C1) in Equation (2). In this example, according to Equation (2) above, MC=0.5807 ml.

Example 2: Velocity Determination

In one example, to determine and/or estimate the velocity of the fluid, two values are programmed into the non-volatile memory (e.g., in the processor 320 and/or the PC 350). In this example, the first value is the angle of the fluid measurement device, and the second value is the distance or length of the hose (e.g., from a shutoff valve between a milking claw and the conduit of the fluid measurement device) to the fluid measurement device. The formulas (3) and (4) for calculating the velocity of the fluid may be, for example, in an Excel format as follows:

$$V1 = \text{SQRT}((2*(9.8*(\text{SIN}(60*PI(\ )/180))))*X) \quad (3)$$

$$V2 = \text{SQRT}((V1^{\wedge}2) + (2*(9.8*(\text{SIN}(Y*PI(\ )/180))))*Z) \quad (4)$$

where X is the hose distance or length, Y is the meter angle, and Z is the hose distance or length at the meter angle. Since V1 is recited in the formula (4) above for V2, in one example, the formulas (3) and (4) may be combined into a single formula (e.g., by those skilled in the art). In one example, where there is no additional hose length, X is 0.127. In such an example, Y can be 28.5°, and Z is thus 0.1206. However, in practice, the hose may have a length of from 4 to 36 inches (10-100 cm) or any length or range of lengths therein (such as 12-24 inches), and the fluid measuring device (i.e., meter) can have an angle of 5-45° (or any angle or range of angles therein, such as 15-35°). The term (Y*PI( )/180) may be used to convert degrees into radians. In the example in which X is 0.127, Y is 28.5° and Z is 0.1206, V1=1.4682 meters/second (m/s), and V2=1.8121 m/s.

An Exemplary Control Circuit

Figure 4:
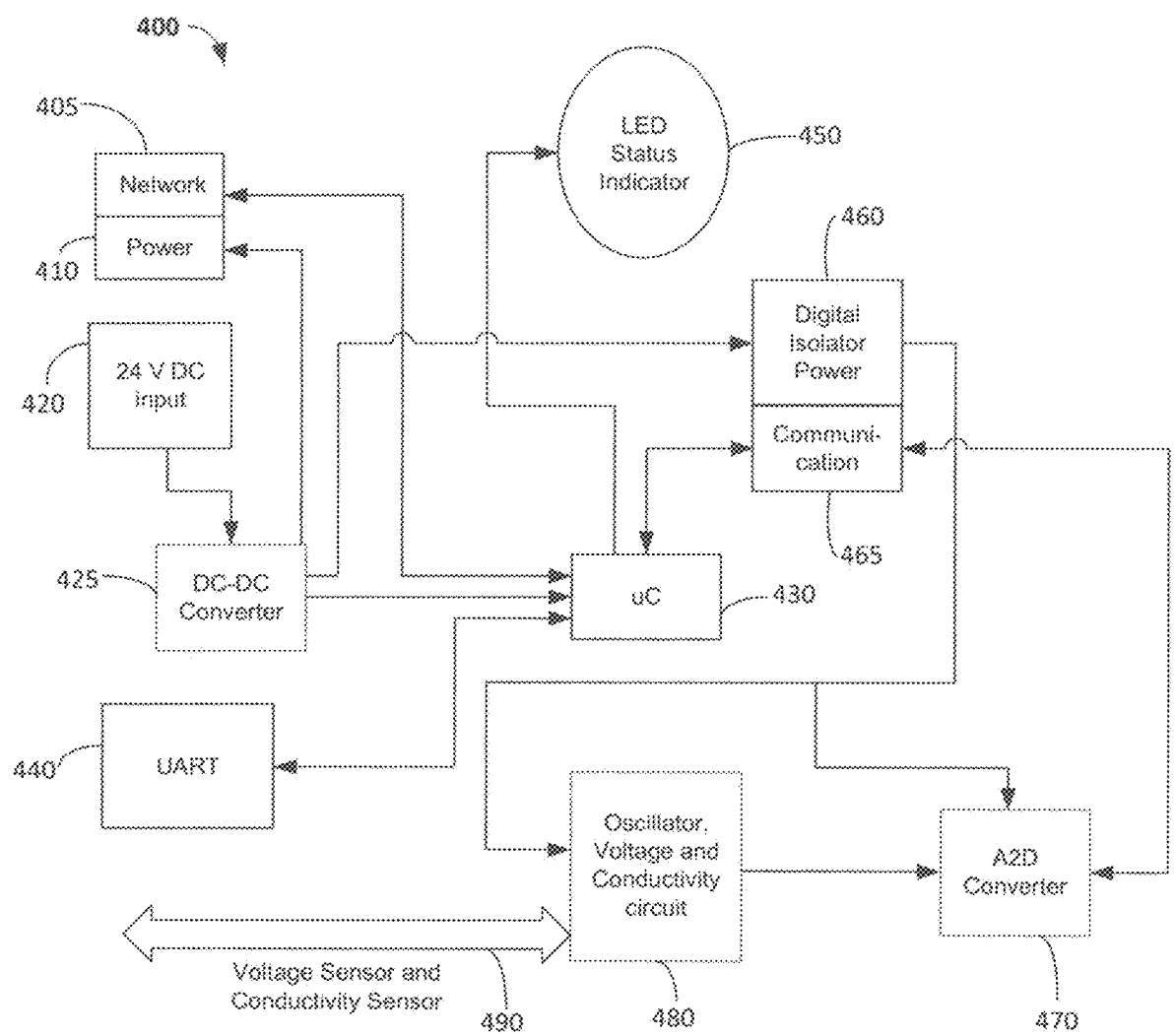
FIG. 4 is a block diagram showing an exemplary circuit suitable for one or more embodiments of the present invention.

FIG. 4 is a diagram showing an exemplary circuit 400 suitable for controlling the present fluid measurement device in accordance with one or more embodiments of the present invention. The circuit 400 can be formed in or on the external device 310 in FIG. 3 or on the PCB on which the processor 320 is located, for example. The circuit 400 includes a network input/output or access port 405, a power supply block 410, a direct current (DC) input 420, a DC-DC converter 425, a microcontroller (C) 430, a universal asynchronous receiver/transmitter (UART) 440, an LED status indicator 450, a digital isolator power supply 460, a communication unit 465, an analog-to-digital (A2D) converter 470, and an oscillator, voltage and conductivity input 480.

The oscillator, voltage and conductivity circuit 480 receives and transmits information from the voltage sensor and conductivity sensor on a bus 490. The DC input 420 provides a direct current or voltage to the DC-DC converter 425. In one example, the DC input 420 provides a voltage of 24V. The DC-DC converter 425 may comprise an inductor (e.g., a small package or low-profile inductor), but external capacitors (e.g., electrolytic capacitors) are not necessary or required for the inductor. The DC-DC converter 425 transmits a second DC current or voltage to the power supply block 410 (which provides power or a voltage to the network access port 405) and to the digital isolator power supply 460. In various embodiments, the digital isolator power supply 460 provides power directly to the A2D converter 470 or indirectly to the A2D converter 470 through the oscillator, voltage and conductivity circuit 480. The A2D converter 470 receives analog signals (e.g., the voltages from the conductivity and voltage sensors) from the oscillator, voltage and conductivity circuit 480 and provides corresponding digital signals to the communication unit 465. The A2D converter 470 may also receive digital signals from the communication unit 465 (e.g., data to be stored in the look-up tables 332 and/or 344) and provide corresponding analog signals to the oscillator, voltage, and conductivity circuit 480 (which, in some embodiments, may include the processor 320 in FIG. 3).

In various embodiments, the UART 440, the network access port 405, and the communication unit 465 transmit information (e.g., one or more digital signals) to the microcontroller 430. The microcontroller 430 (which may be in or on the external device 310 in FIG. 3) may provide one or more signals to each of an LED status indicator 450, the network access port 405, the UART 440 and the communication unit 465. The UART 440 may be a stand-alone IC configured to buffer an external signal and/or convert an external parallel signal to a serial signal for transmission to the microcontroller 430, and may include, e.g., pins for interfacing with a flash memory (not shown). The UART 440 may also buffer a digital signal from the microcontroller 430 and/or convert a serial signal from the microcontroller 430 to a parallel signal (e.g., for transmission to an external device; not shown). Alternatively, the UART 440 may be incorporated into the microcontroller 430. The microcontroller 430 may receive a power supply or voltage from the DC-DC converter 425

An Exemplary Method of Manufacturing a Fluid Measurement Device

Figure 5:
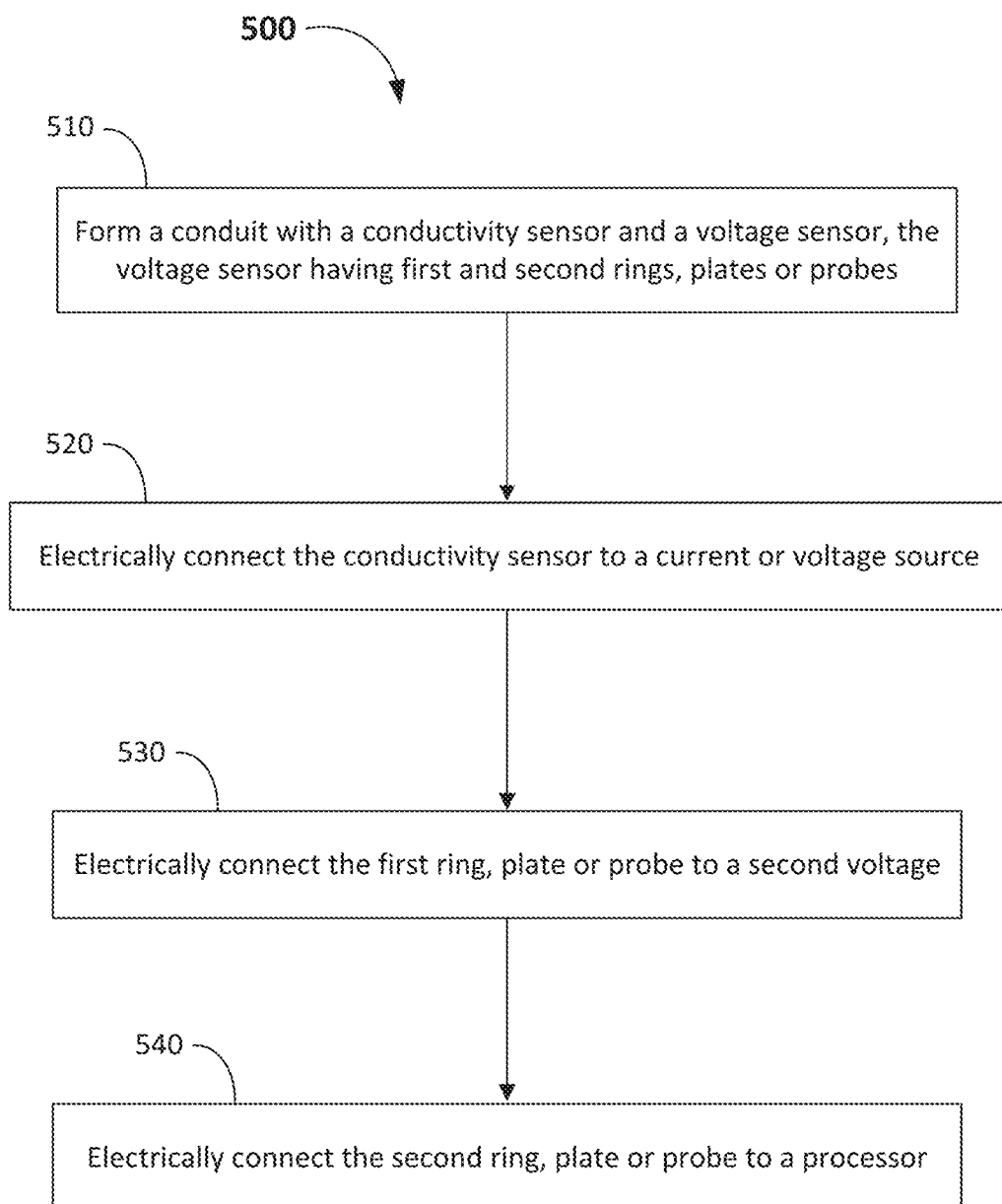
FIG. 5 is a flow chart showing steps of an exemplary method of manufacturing a fluid measurement device according to one or more embodiments of the present invention.

FIG. 5 is a flow chart 500 showing steps of an exemplary method of manufacturing a fluid measurement device according to one or more embodiments of the present invention. The exemplary method generally includes forming a conduit with a conductivity sensor and a voltage sensor having first and second rings, probes, or plates spaced apart at a predetermined distance in the conduit, electrically connecting the conductivity sensor and the first ring, probe, or plate of the voltage sensor to a current source and a first voltage, respectively, and electrically connecting the second ring, probe, or plate to a processor configured to measure a volume and/or weight of the fluid from the electrical conductivity or voltage of the fluid (from the conductivity sensor) and a capacitance or second voltage from the voltage sensor.

At step 510, the conduit is formed with the conductivity sensor and the voltage sensor therein. Forming the conduit may comprise molding (e.g., injection molding) the conduit, which may have a generally cylindrical or tubular shape, and optionally, one or more fins or connectors attached to the conduit. The fins or connectors may be useful for securing the conduit to a holder (e.g., a mounting table) for the fluid measurement device.

In exemplary embodiments, the first and second rings, probes, or plates of the voltage sensor are formed in or along, or are attached to, a surface of the cylindrical wall of the conduit. In one embodiment, the first and second rings or plates are attached to an outer surface of the conduit. Forming or attaching the first and second rings or plates of the voltage sensor to an outer surface of the conduit may comprise wrapping the rings or plates around the outer surface of the conduit wall with a predetermined space or distance between the rings or plates, and adhering or connecting the rings or plates to the conduit wall. For example, the rings or plates of the voltage sensor may extend from the lowermost outer surface of the conduit to the uppermost outer surface of the conduit. Alternatively, in applications in which the fluid does not or cannot completely fill the conduit, the rings or plates of the voltage sensor may extend along the external surface of the conduit to a height greater than or equal to the maximum height of the fluid in the conduit. In such embodiments, the conduit wall may have a cylindrical shape. In various examples, adhering or connecting the rings or plates to the conduit wall may comprise clipping, clamping and/or strapping each of the rings or plates with one or more clips, clamps and/or straps.

Alternatively, the first and second rings or plates may be formed in or along an inner surface of the conduit. For example, the conduit may be formed with one or two annular or semi-annular impressions or wells in the inner surface, and the first and second rings or plates may be placed in the impression(s) or well(s) in the conduit wall with a predetermined space or distance between the rings or plates. Alternatively, the first and second rings or plates may extend from a lowermost inner surface of the conduit along the inner surface of the conduit to a height in the conduit greater than or equal to the maximum height of the fluid in the conduit. In such embodiments, the first and second rings or plates may be adhered or connected to the conduit wall in a similar manner as when the rings or plates are adhered or connected to the outer surface of the conduit.

Probes may comprise plates or rods extending through the wall of the conduit, into the interior of the conduit, with a predetermined space or distance between them. The probes may be secured to the conduit wall using any known mechanism. In various examples, the probes of the voltage sensor may extend from the lowermost inner surface of the conduit to the uppermost inner surface of the conduit (or very close thereto). The probes may be adhered or connected to the uppermost inner surface of the conduit wall.

In exemplary embodiments, the conductivity sensor comprises first and second electrodes separated by a channel (which may have a predetermined width or spacing) along a lowermost inner surface of the conduit. The width or spacing of the channel may be, for example, from ⅛ to ½ inch (e.g., 2-15 mm, or any value or range of values therein). The first and second electrodes may each comprise a metal plate in a vertical wall along the lowermost inner surface of the conduit, the vertical wall having a horizontal surface above the electrode. The channel between the first and second electrodes may be formed by securing the electrodes in a mold (e.g., an injection mold) that forms openings in the vertical walls. In one embodiment, the first and second rings, plates or probes may also be secured in the same mold as the conductivity sensor electrodes, and a plastic material may be injected or otherwise introduced into the mold to for the conduit with the conductivity and voltage sensor electrodes in place. The horizontal surfaces above the conductivity sensor electrodes may prevent fluid from contacting the electrodes.

At 520, the conductivity sensor is electrically connected to a current source. In various embodiments, the method further comprises forming one or more (e.g., two) leads from each of the electrodes of the conductivity sensor, electrically connected to the electrode. For example, each electrode of the conductivity sensor may have a corresponding lead or leads that extend through the outer surface of the conduit, and the method may comprise securing the sensor electrodes in place in a mold, and applying, injecting or squirting plastic around the sensor electrodes such that the electrodes are along the vertical wall in the conduit and the leads extend through the conduit wall. The leads are then connected to traces on a circuit board (e.g., external device 310 in FIG. 3), which may be connected to a processor or other control circuit (e.g., processor 320 in FIG. 3).

At 530, the first ring, probe, or plate of the voltage sensor is electrically connected to a first voltage. For example, the first voltage can be from 2V to 5V, or any voltage or range of voltages therein (e.g., 3.5V). In some embodiments, a first terminal of the first ring, probe, or plate is connected to the first voltage (e.g., supplied by a trace on the PCB or in the external device, the trace being connected at an opposite end to the digital isolator power supply 460 in FIG. 4), and a second terminal of the first ring, probe, or plate is connected to another trace that, in turn, provides a complementary power supply (e.g., a ground plane or a negative voltage from the digital isolator power supply 460). Wires between may be connected between the leads or terminals of the first ring, probe, or plate and the traces on the PCB or in the external device.

At 540, the second ring, probe, or plate of the voltage sensor is electrically connected to a processor. For example, a first terminal of the second ring, probe, or plate is connected to a trace on the PCB or in the external device, connected at an opposite end to the processor (e.g., processor 320 in FIG. 3). Optionally, a second terminal of the second ring, probe, or plate is similarly connected to the processor using another trace on the PCB or in the external device. Wires may be connected between the leads or terminals of the second ring, probe, or plate and the traces on the processor.

Exemplary Method of Measuring an Amount of Fluid

An exemplary method of measuring an amount of fluid according to embodiments of the present invention includes applying a first predetermined voltage to a first ring, probe, or plate of a voltage sensor, detecting at a predetermined rate a capacitance or a second voltage on a second ring, probe, or plate of the voltage sensor, determining an electrical conductivity or voltage of the fluid using a conductivity sensor in a conduit through which the fluid flows, and calculating the volume and/or weight of the fluid from the amount of fluid between the first and second rings, probes, or plates, a velocity of the fluid, and the predetermined rate. In one example, the velocity of the fluid may be based on or determined from an angle of the conduit and optionally, the length of a hose attached to the fluid measuring device (as described herein). Alternatively, the velocity may be determined empirically and input as a value (e.g., assuming that the angle of the conduit is fixed and/or known). For example, the velocity may be determined by estimating the velocity and subsequently refining the estimate using measurements of the volume of a fluid having known or standard properties passing through the conduit per unit time. The fluid passes through the first and second rings, probes, or plates. The second ring, probe, or plate is spaced apart from the first ring, probe, or plate by a predetermined distance. The value of the capacitance or second voltage corresponds to the amount of the fluid in the conduit between the first and second rings, probes, or plates.

The fluid measurement device (e.g., meter) may receive a start signal to begin the measuring process and a stop signal to end the measuring process. The start and stop signals may be transmitted by the user interface device, the external device, the switch, and/or the processor (e.g., the CPU of an external PC). In various embodiments, a first voltage is applied to the first ring, probe, or plate of the voltage sensor, and a capacitance or a second voltage is read from the voltage sensor (e.g., the second ring, probe, or plate) by a processor. The voltage sensor is read or sampled from 10 to 10,000 times per second, or any frequency or range of frequencies therein (e.g., in one example, approximately 800 times per second). The amount of fluid flowing through the conduit causes the voltage to vary on the second ring, probe, or plate of the voltage sensor. The voltage from the second ring, probe, or plate of the voltage sensor also depends on the conductivity of the particular fluid (e.g., milk). Consequently, a voltage or current may be applied to one electrode of the conductivity sensor, and a voltage, current, or capacitance of the conductivity sensor (e.g., from the other electrode) may be read by the processor to determine the conductivity of the fluid.

In various embodiments, the volume of fluid between the first and second rings, probes, or plates of the voltage sensor is selected or identified from values in a look-up table using the electrical conductivity of the fluid (or a voltage from the conductivity sensor) and the capacitance or second voltage from the voltage sensor. For example, the voltage reading identifies a plurality of possible volume values in the lookup table, and an estimated volume is selected from the plurality of possible volume values based on the conductivity value of the fluid. Interpolation may be performed to determine a more accurate volume of fluid present between the first and second voltage sensor rings, probes, or plates.

Information collected by the fluid measurement device may be converted to total weight or volume of the fluid passing through the fluid measurement device within a given time period. The time period may be based on or defined by the start and stop signals. First, a calibration value or factor may be applied to the fluid volume in the voltage sensor. The calibration value or factor scales the determination or measurement of fluid volume in the voltage sensor based on certain manufacturing tolerances and/or variables (which may be known and/or empirically determined). The velocity of the fluid is calculated from the angle of the fluid measurement device conduit. Additionally, the distance that the fluid travels through the conduit or the fluid measurement device and any hose attached to the conduit or the fluid measurement device may be used to calculate the velocity of the fluid. Next, the flow rate of the fluid may be calculated in volume (e.g., gallons or liters) per unit time (e.g., seconds or minutes) and/or weight (e.g., pounds or kilograms) per unit time. Subsequently, the volume per unit time or weight per unit time is divided by the sampling rate (e.g., number of samples taken by the voltage sensor per second) to provide a quotient. Finally, the quotient of each sample is accumulated until the fluid measurement device receives the stop signal. The accumulated quotients are the volume or weight of the fluid that passed through the fluid measurement device over the given time period.

CONCLUSION/SUMMARY

The present invention provides a fluid measurement device that advantageously measures a volume and/or weight of a fluid (e.g., milk produced by a dairy animal during a milking session. Additionally, the present fluid measurement device includes only one voltage sensor to determine the volume and/or weight of the fluid. The present fluid measurement device minimizes the cost of parts and/or components, and may reduce the need for maintenance. Also, the present fluid measurement device and fluid measuring method may be more accurate than prior device(s) and method(s) having more than one voltage sensor. As a result, the present fluid measurement device efficiently and effectively provides more accurate measurements of milk produced by dairy animals.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. A method of manufacturing a fluid measurement device, comprising:
    a) forming a conduit with a conductivity sensor and a voltage sensor therein, the conduit being configured to transport a fluid, the voltage sensor comprising first and second rings, probes, or plates spaced apart from each other at a first predetermined distance in the conduit;
    b) electrically connecting the conductivity sensor to a current source, the conductivity sensor being configured to determine (i) an electrical conductivity of the fluid or (ii) a first voltage or a first capacitance across at least part of the fluid;
    c) electrically connecting the first ring, probe, or plate of the voltage sensor to a predetermined voltage; and
    d) electrically connecting the second ring, probe, or plate to a processor, the second ring, probe, or plate being configured to detect a second capacitance or a second voltage, wherein a numerical value of the second capacitance or the second voltage corresponds to an amount of the fluid in the conduit between the first and second rings, probes, or plates, and the processor is configured to measure or calculate an amount of the fluid flowing through the conduit from the electrical conductivity of the fluid or the first voltage or the first capacitance from the conductivity sensor and the second capacitance or the second voltage from the second ring, probe, or plate.

2. The method of claim 1, wherein the first and second rings, probes, or plates extend from an uppermost surface of the conduit to a lowermost surface of the conduit, such that the fluid passes through the first and second rings, probes, or plates.

3. The method of claim 2, wherein the conductivity sensor is at or along the lowermost surface of the conduit.

4. The method of claim 1, wherein forming the conduit comprises molding the conduit.

5. The method of claim 4, wherein the conduit has a cylindrical or tubular shape.

6. The method of claim 4, further comprising forming or attaching one or more fins or connectors on or to the conduit, the fins or connectors configured to secure the conduit to a holder.

7. The method of claim 1, wherein forming the first and second rings or plates comprises forming the first and second rings or plates along an inner surface of the conduit.

8. The method of claim 1, wherein forming the conduit comprises forming two annular or semi-annular impressions or wells in an inner surface of the conduit, and placing the first and second rings or plates in the impressions or wells.

9. The method of claim 1, wherein the first and second rings or plates extend from a lowermost inner surface of the conduit along the inner surface of the conduit to a height in the conduit greater than or equal to a maximum height of the fluid in the conduit.

10. The method of claim 1, wherein the conductivity sensor comprises first and second electrodes spaced apart from each other by a second predetermined distance, and the method further comprises electrically connecting at least one lead to each of the first and second electrodes of the conductivity sensor.

11. The method of claim 10, further comprising securing the first and second electrodes in place in a mold, and applying, injecting or squirting plastic around the first and second electrodes such that the electrodes are along a wall in the conduit and the at least one lead extends through the wall.

12. The method of claim 11, further comprising connecting the at least one lead to traces on a circuit board, at least one of the traces being connected to the processor or other control circuit.

13. The method of claim 1, wherein the processor is further configured to calculate the amount of the fluid flowing through the conduit from a velocity of the fluid and the volume of the fluid in the voltage sensor.

14. The method of claim 13, wherein the processor is further configured to calculate the amount of the fluid flowing through the conduit from a sampling rate of the second voltage.

15. The method of claim 13, wherein the velocity of the fluid is determined from a predetermined angle of the conduit and a distance that the fluid travels prior to entering the fluid measurement device, from an initial reference point to the conduit.

16. The method of claim 1, wherein the conduit comprises a non-conductive cylinder or tube.

17. The method of claim 1, further comprising programming a look-up table into a memory in the processor or in an external device in communication with the processor, the look-up table having plurality of columns and a plurality of rows, and storing values of the volume of the fluid in the voltage sensor corresponding to a particular combination of the conductivity of the fluid and a value of the second capacitance or the second voltage.

18. The method of claim 1, wherein the fluid is milk.

19. The method of claim 1, wherein the predetermined voltage is from 2V to 5V.

* * * * *